United States Patent
Beall et al.

(10) Patent No.: US 6,813,903 B2
(45) Date of Patent: Nov. 9, 2004

(54) METHOD OF MAKING FORSTERITE GLASS-CERAMICS

(75) Inventors: George H. Beall, Big Flats, NY (US); Joseph E. Pierson, Painted Post, NY (US); Linda R. Pinckney, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/674,855

(22) Filed: Sep. 30, 2003

(65) Prior Publication Data

US 2004/0072669 A1 Apr. 15, 2004

Related U.S. Application Data

(62) Division of application No. 09/929,549, filed on Aug. 14, 2001, now Pat. No. 6,660,669.
(60) Provisional application No. 60/160,053, filed on Oct. 18, 1999.

(51) Int. Cl.[7] .............................................. C03C 10/04
(52) U.S. Cl. .......................................... 65/33.1; 65/33.7
(58) Field of Search ............................. 65/33.1, 33.7; 501/5–8, 53, 55, 56, 62, 68, 70

(56) References Cited

U.S. PATENT DOCUMENTS

| | | | | |
|---|---|---|---|---|
| 2,912,340 A | * | 11/1959 | Pincus | 501/119 |
| 3,020,619 A | * | 2/1962 | Koch | 264/656 |
| 3,365,314 A | * | 1/1968 | Werner | 501/151 |
| 4,009,015 A | * | 2/1977 | McCollister | 65/134.3 |
| 4,560,666 A | * | 12/1985 | Yoshida et al. | 501/5 |
| 5,717,517 A | | 2/1998 | Alfano et al. | 359/342 |
| 5,877,101 A | * | 3/1999 | Terai | 501/32 |
| 5,958,807 A | | 9/1999 | Kumar et al. | 501/5 |
| 6,017,642 A | | 1/2000 | Kumar et al. | 428/630 |
| 6,297,179 B1 | | 10/2001 | Beall et al. | 501/5 |
| 6,300,262 B1 | | 10/2001 | Beall | 501/5 |
| 6,303,527 B1 | * | 10/2001 | Pinckney | 501/5 |
| 6,531,420 B1 | * | 3/2003 | Beall et al. | 501/5 |
| 2001/0017044 A1 | * | 8/2001 | Mitra et al. | 65/134.3 |
| 2001/0043996 A1 | * | 11/2001 | Yamada et al. | 428/34.4 |
| 2001/0049327 A1 | * | 12/2001 | Hachitani | 501/69 |
| 2002/0042337 A1 | * | 4/2002 | Zou et al. | 501/45 |
| 2002/0121114 A1 | * | 9/2002 | Mannemann et al. | 65/135.3 |

FOREIGN PATENT DOCUMENTS

| | | | | |
|---|---|---|---|---|
| JP | 01-308843 | * | 12/1989 | C03C/3/07 |
| WO | 01/28945 A1 | | 4/2001 | |

OTHER PUBLICATIONS

T. Murata et al., "Compositional Dependence Of The Valency State of Cr Ions In Oxide Glasses", Journal of Non–Crystalline Solids 220 (1997), pp. 139–146.

G.H. Beall, "Glass–Ceramics For Photonic Applications", Int. Symp. On Crystallization In Glasses & Liquids, Glastech. Ber. Glass Sci. Technol. 73 C1 (2000), pp. 3–11.

* cited by examiner

Primary Examiner—Steven P. Griffin
Assistant Examiner—Carlos Lopez
(74) Attorney, Agent, or Firm—Svetlana Z. Short

(57) ABSTRACT

A composition for a glass-ceramic material that contains a crystallinity of at least about 30% by weight of forsterite components at a liquidus temperature of about 1525° C. or below. The glass-ceramic has a composition, in weight percent on an oxide basis, consisting essentially of about: 40–60% $SiO_2$; 10–25% $Al_2O_3$; 18–30% MgO; 3–10% $Na_2O$; 0–10% $K_2O$; >5–15% $TiO_2$. The invention further comprises a method for achieving high crystalline yield at such a low liquidus with increased solubility of high levels of chromium ions. The glass-ceramics can be used in drawing optical fibers and as gain media in amplifier and laser devices for near infrared wavelengths.

12 Claims, 5 Drawing Sheets

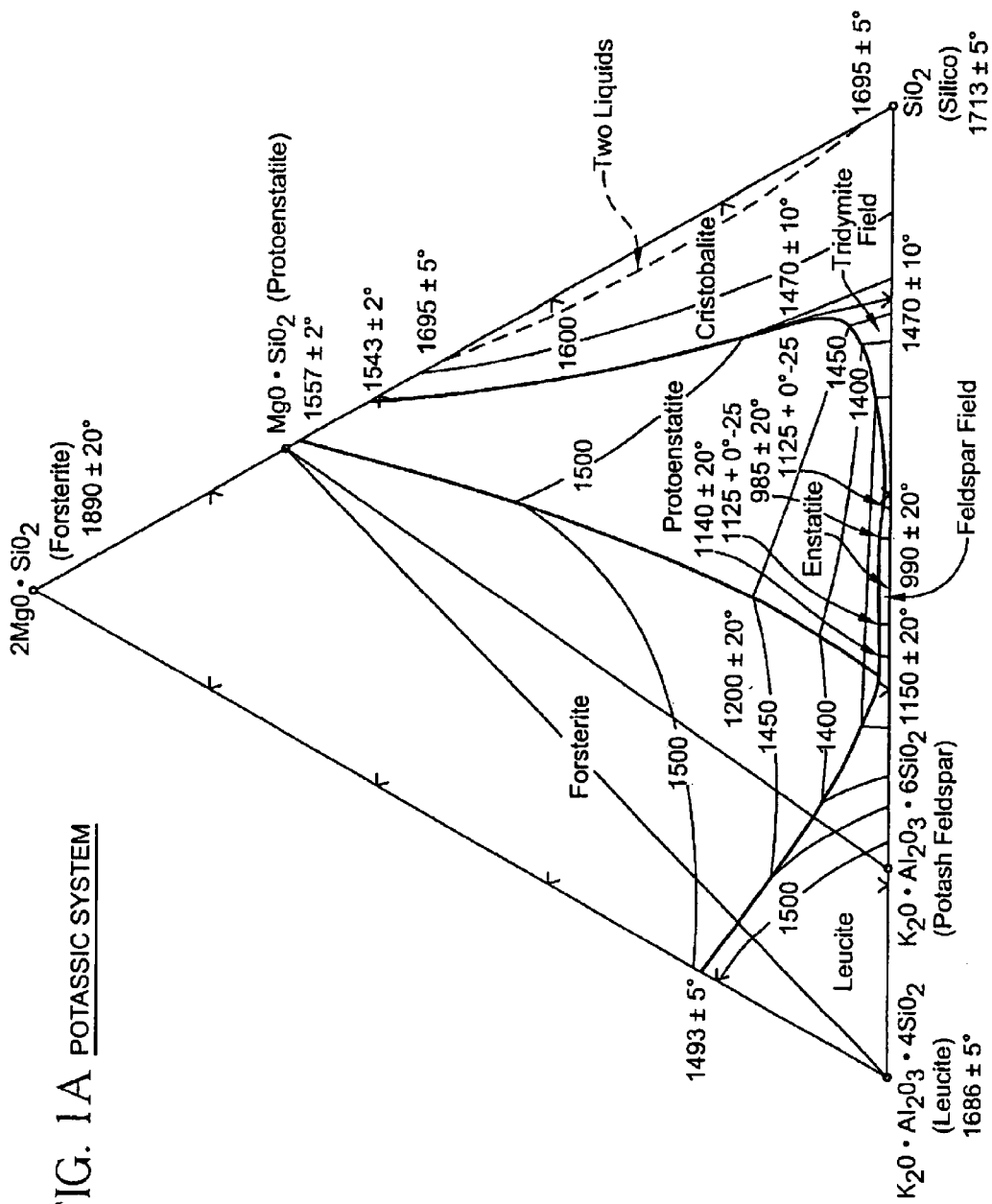
FIG. 1A POTASSIC SYSTEM

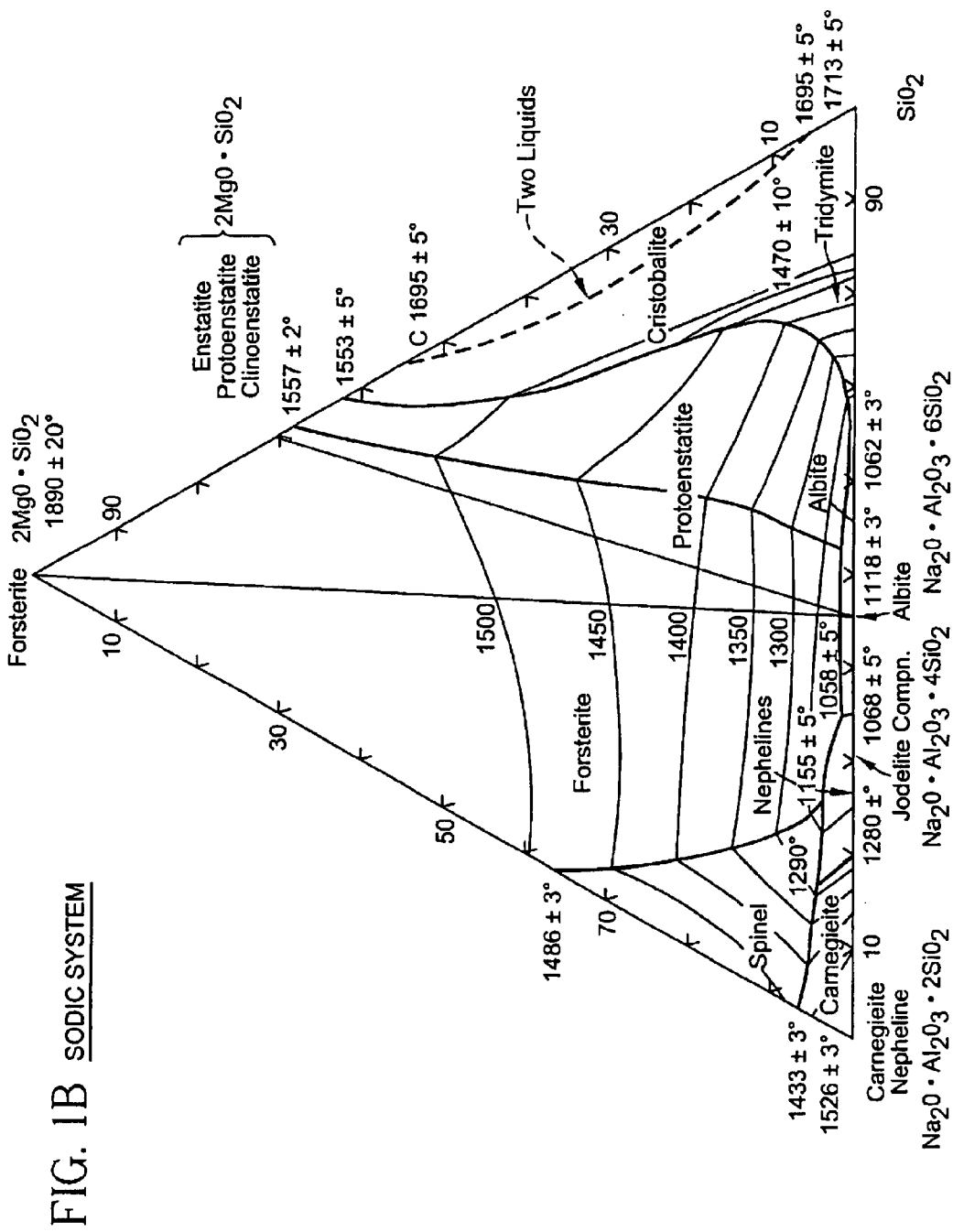
FIG. 1B SODIC SYSTEM

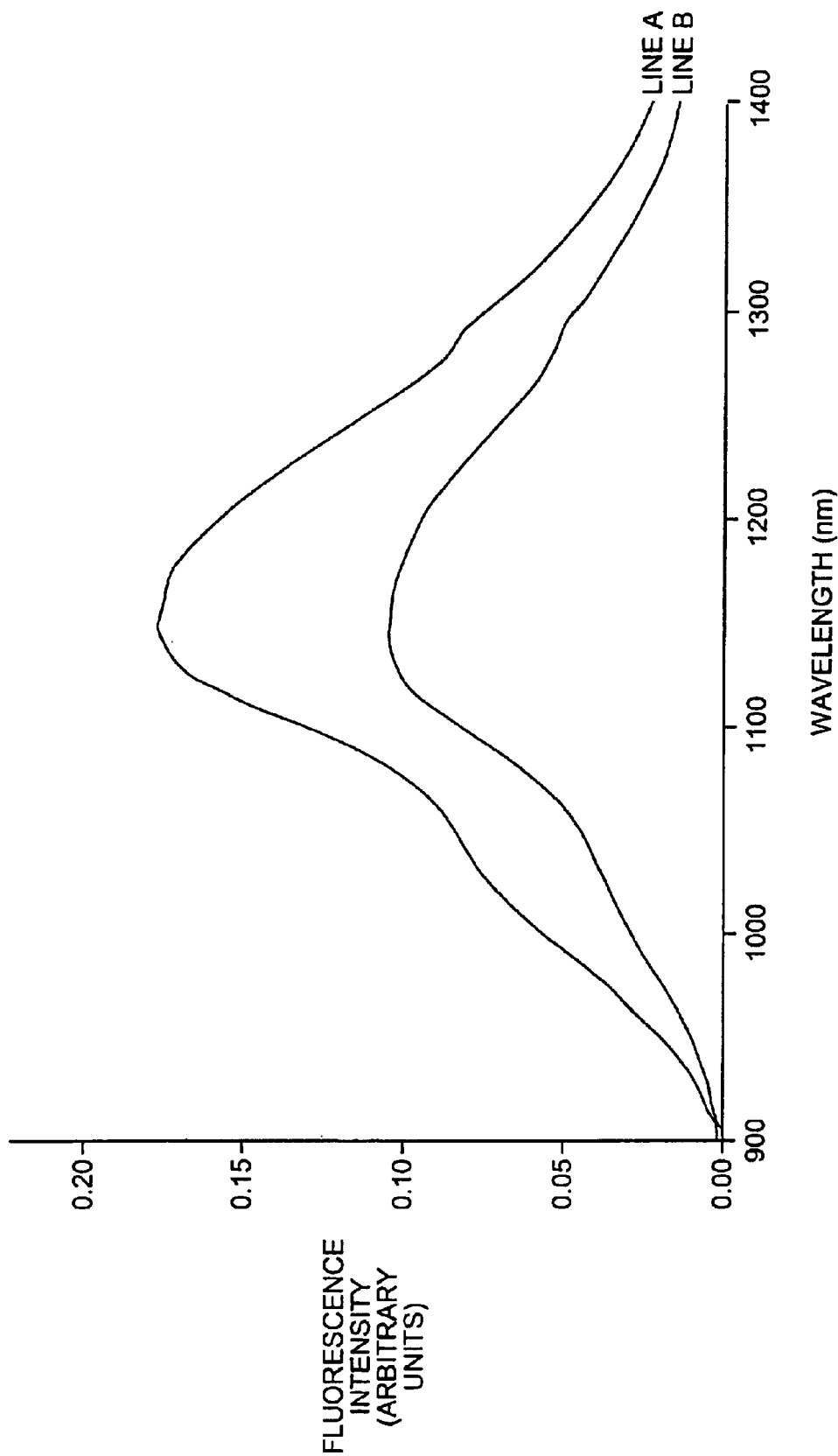
FIG. 2 FORSTERITE GLASS - CERAMICS: KAS AND KNAS HOST GLASS

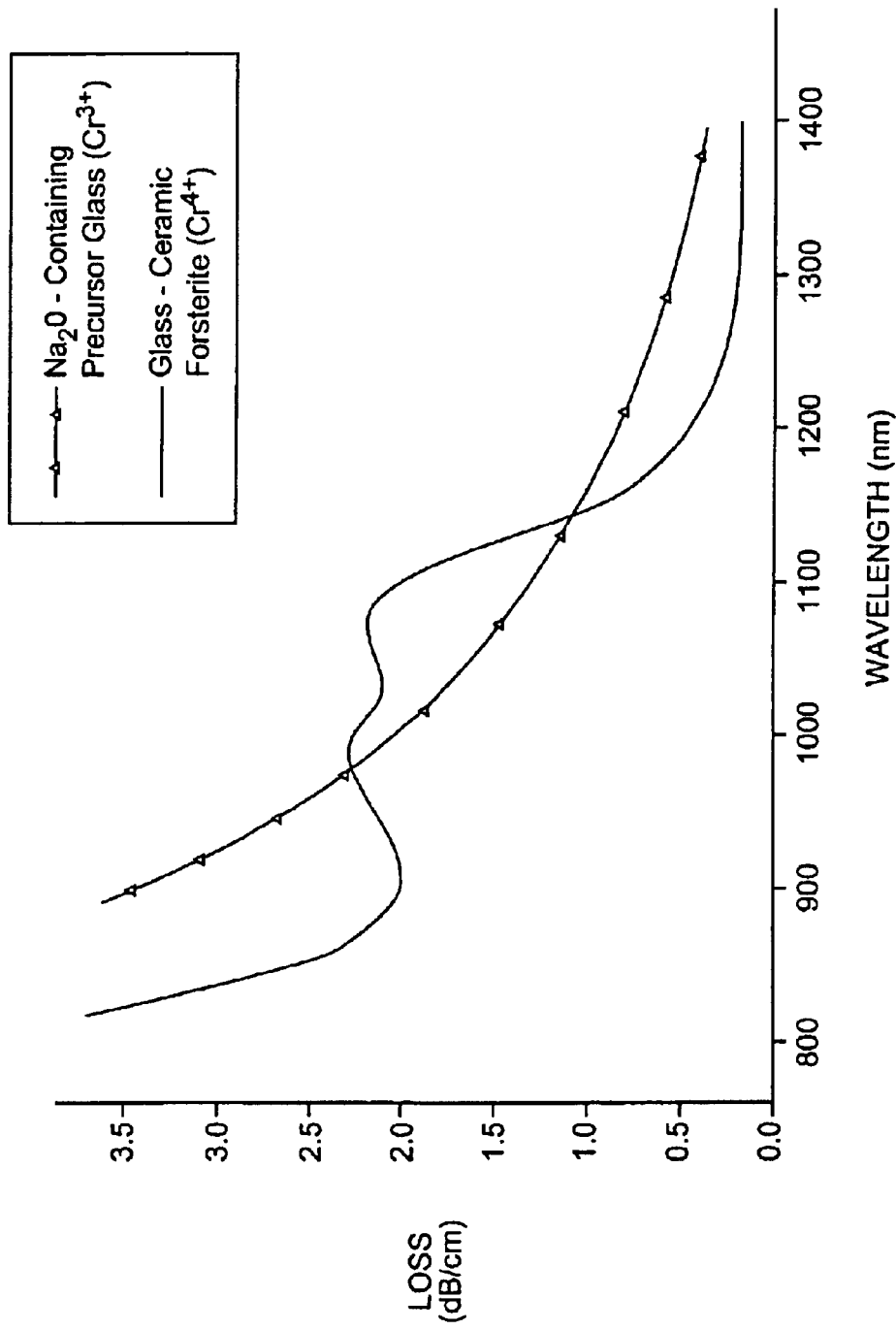
FIG. 3A Na₂O-CONTAINING HIGH-CRYSTALLINITY GLASS-CERAMIC

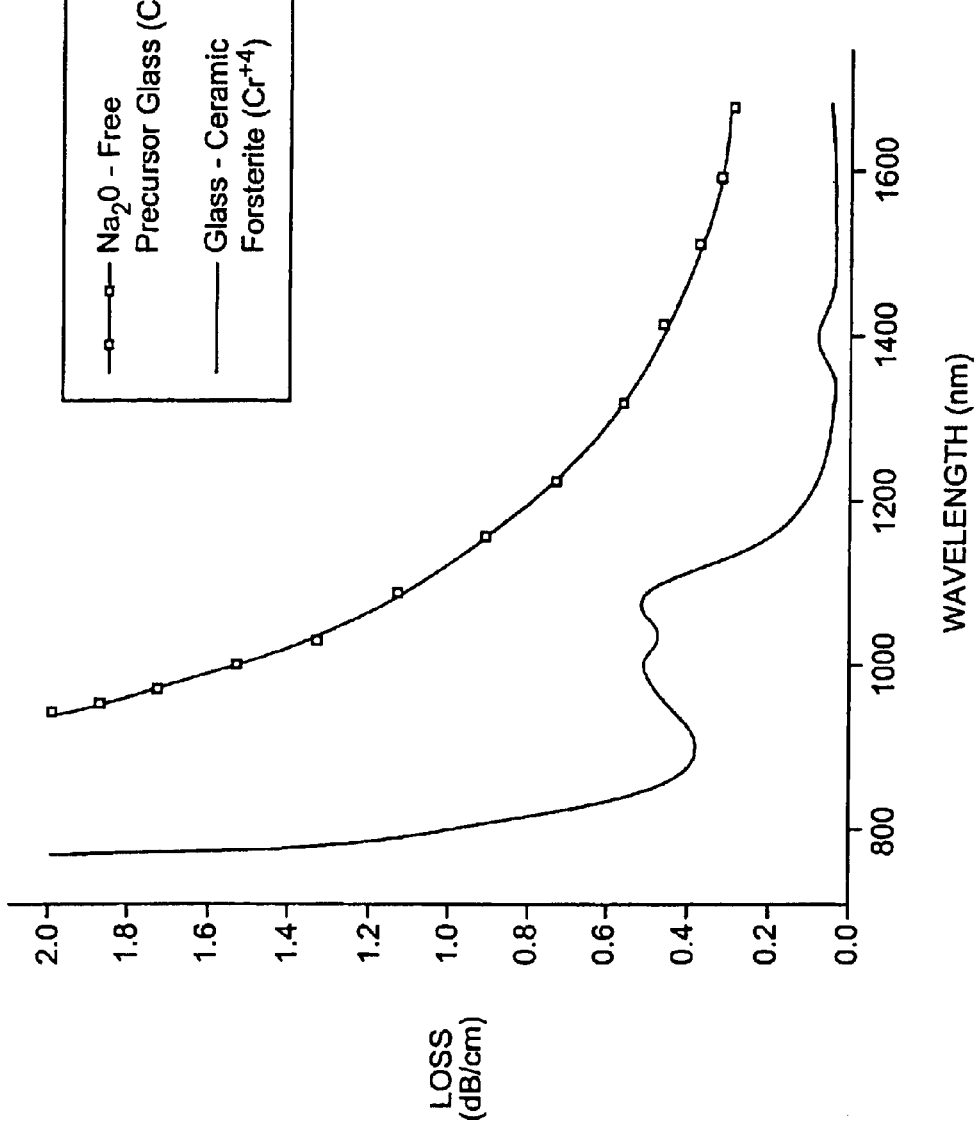
FIG. 3B Na₂O - FREE LOW - CRYSTALLINITY GLASS - CERAMIC (Unclad Cr- Doped Forsterite Fiber)

METHOD OF MAKING FORSTERITE GLASS-CERAMICS

RELATED APPLICATIONS

This application is a divisional of application Ser. No. 09/929,549 filed Aug. 14, 2001, now U.S. Pat. No. 6,660,669 and the benefit of priority pursuant to 35 U.S.C. §120 is hereby claimed.

U.S. patent application Ser. No. 09/686,418, entitled TRANSPARENT FORSTERITE GLASS-CERAMICS, filed on Oct. 11, 2000, in the name of George H. Beall, claiming priority to U.S. Provisional Application No. 60/174,012 filed on Oct. 18, 1999.

U.S. patent application Ser. No. 09/686,564, entitled TRANSITION-METAL GLASS-CERAMIC GAIN MEDIA, filed on Oct. 11, 2000, in the name of George H. Beall, Nicholas F. Borrelli, Eric J. Mozdy, and Linda R. Pinckney, claiming priority to U.S. Provisional Application No. 60/160,053 filed on Oct. 18, 1999.

FIELD OF INVENTION

The present invention relates generally to glass-ceramics containing forsterite ($Mg_2SiO_4$) as the major crystalline phase. More particularly, the glass-ceramics have a small crystal size to make the glass-ceramic material optically transparent and are doped with chrome (Cr) at relatively high levels, which is useful as gain media, in optical amplifiers and/or laser pumps. The term "gain media" refers to an optical component that produces optical fluorescence and is capable of amplifying an optical signal in the same wavelength range as the optical fluorescence. The invention also relates to a more formable glass-ceramic composition that is useful for drawing optical fibers.

BACKGROUND

Recently, researchers have concentrated much effort to develop transparent glass-ceramics as hosts for transition metal ions. Transition metals have been used as optically active dopants in crystalline hosts because they fluoresce in the near infrared (~1000 nm to ~1500 nm) region. Given the useful wavelength range and relatively wide bandwidth of many transition-metal dopants, much interest has arisen for their use in optical telecommunication applications. The current optical telecommunication. medium is glass-based optical fiber. Inclusion of transition metal dopants into glasses, however, has unfortunately not produced fluorescence performances as good as in crystalline materials. The performance of transition metal ions tends to degrade in amorphous hosts, where the crystal field strength is much smaller than in even single-crystal hosts.

Suitable glass-ceramic hosts, therefore, must be tailored such that transition elements will preferentially partition into the crystal phase. Some of these glass-ceramics have come from compositions such as those discussed in co-pending U.S. patent application Ser. No. 09/686,418, entitled TRANSPARENT FORSTERITE GLASS-CERAMICS, by George H. Beall, which relates to a family of glass compositions based in the $K_2O$—$MgO$—$Al_2O_3$—$SiO_2$ system, or in co-pending U.S. patent application Ser. No. 09/686,564, entitled TRANSITION-METAL GLASS-CERAMIC GAIN MEDIA, by George H. Beall et al., which relates to transition-metal-doped glass-ceramic materials used as gain media or pump laser fiber in optical amplifiers and lasing mechanisms. The entire contents of both of these applications are incorporated herein by reference.

Glass-ceramics are polycrystalline materials formed by a controlled crystallization of a precursor glass. In general, the method for producing such glass-ceramics customarily involves three fundamental steps: first, melting a glass-forming batch containing the selected metallic oxides; second, cooling the melt to a temperature at least below its transformation range, while simultaneously forming a glass body of a desired geometry; and third, heating the glass body to a temperature above the transformation range of the glass in a controlled manner to generate crystals in situ. To develop nuclei in the glass, the glass will be heated initially to a temperature within or somewhat above the transformation range for a period of time. Thereafter, the temperature will be raised to levels approaching, or even exceeding, the softening point of the glass to grow crystals from the nuclei. The resulting crystals are typically uniformly distributed and fine-grained. Internal nucleation permits glass-ceramics to have favorable qualities such as a very narrow distribution of particle size and a highly uniform dispersion of crystals throughout the glass host.

Transparent glass-ceramics are known in the art, with the classic study relating to transparency being authored by G. H. Beall and D. A. Duke in "Transparent Glass Ceramics," *Journal of Material Science*, 4, pp. 340–352 (1969). Glass-ceramic bodies will display transparency to the human eye when the crystals present therein are considerably smaller than the wavelength of visible light. In other words, transparency typically results from crystals less than 50 nm—preferably as low as 10 nm—in size. Transparency in glass-ceramics, alternatively, can also be produced with crystals larger than 50 nm if the crystal birefringence and the index of refraction mismatch between the crystal phase and the glassy phase are both low. Transparent glass-ceramics, doped with transition elements can combine the optical efficiency of crystals with the flexibility of the forming of glass. For example, both bulk (planar substrates) and fiber forms can be fabricated from these glass-ceramics.

Forsterite is an orthosilicate with two distinct octahedral sites, both occupied by $Mg^{2+}$, and one tetrahedral site occupied by $Si^{4+}$. All three of these cation sites are highly distorted. The octahedral sites have mirror and inversion symmetries and the tetrahedral site is pyramidally distorted. It has been shown that chromium ions can enter the forsterite structure as $Cr^{3+}$ in the octahedral sites, and as $Cr^{4+}$ in the tetrahedral sites. The $Cr^{4+}$ ion has further been identified as the key lasing ion in single crystals responsible for the major portion of luminescence over the wide band extending from about 900 nm to about 1400 nm and centered at about 1175 nm. (A shoulder on the band near 1000 nm is attributed to $Cr^{3+}$ ions).

Chromium-doped forsterite, a transition-metal-silicate crystal species, has demonstrated the ability to produce optical gain over a broad portion of the near infrared spectrum and has been fabricated as single-crystal tunable or femtosecond lasers. In the late 1980s, it was discovered that single crystals of chromium-doped forsterite could be used as a laser material in the 1210 nm to 1260 nm region. Further work, determined that the active ion was $Cr^{4+}$, a rare valence state of chromium, and that strong luminescence and tunable laser action could be produced in the broad spectral region from about 1100 nm to about 1400 nm, and perhaps even deeper into the infrared.

In the past, however, the maximum gain (complete population inversion) for a material with about 25% crystalline forsterite particles was calculated, using published optical constants for forsterite, to be about only 240 dB/m. To increase the overall fluorescence within forsterite-containing glass-ceramic materials, a greater crystalline yield of forsterite needs to be achieved. The present invention provides a method and glass composition that satisfies this need.

SUMMARY OF THE INVENTION

The present invention resides in part in transparent glass-ceramics that have a level of nanocrystallinity of at least about 30% forsterite components by weight when at a relatively low liquidus temperature of about 1525–1500° C. or less. This is a higher yield of forsterite component and crystals than was previously achievable, on a sustainable basis, at such relatively low temperatures. The predominant forsterite crystal phase in the glass-ceramic is doped with chromium at levels higher than that which was previously practical to perform forming operations such as drawing optical fibers. In part, the key to improvements in formability with greater crystallinity of forsterite involves the addition of $Na_2O$ as a major ingredient (over about 3% by weight), coupled with increased levels of titania ($\geq 5\%$ by weight) in an original glass composition. The effect of increased amounts of $Na_2O$, in replacing $K_2O$ amounts, is to lower the liquidus temperature of forsterite at a given level of theoretically attainable forsterite in the original glass composition. Moreover, increased sodium levels lead to higher allowable MgO levels, which in turn, increase the solubility of $Cr^{4+}$ ions in the glass. As a result, more $Cr^{4+}$ ions are then available to be incorporated into forsterite nanocrystals for greater luminescence. In short, the invention provides better physical flexibility in forming glass-ceramic objects, and better overall fluorescence and performance in optical gain, due to greater crystallinity.

The glass-ceramics of the present invention have a glass composition, in weight percent on an oxide basis of about 40% to 60% $SiO_2$; 10% to 25% $Al_2O_3$; 18% to 30% MgO; 3% to 10% $Na_2O$; 0% to 10% $K_2O$; >5% to 15% $TiO_2$. Preferably, the composition consists essentially of about 43% to 55% $SiO_2$; 11% to 16% $Al_2O_3$; 20% to 26% MgO; 3.5% to 6.5% $Na_2O$; 3.0% to <8.0% $K_2O$; 5.5% to 9.0% $TiO_2$. To obtain optical activity, i.e., fluorescence, over the infrared telecommunications transmission wavelength range of about 900 nm to about 1400 nm, the present forsterite glass-ceramics are doped with up to about 1.3% chromium oxide by weight, and preferably with about 0.05% to about 0.75% chromium oxide.

The present invention also encompasses a method of dissolving at least 30% by weight of forsterite components in a glass-ceramic. The method comprises providing a $R_2O$—MgO—$Al_2O_3$—$SiO_2$ glass composition, wherein R is an alkali ion, containing, in weight percent, at least about 3% of $Na_2O$ coupled with greater than 5% of $TiO_2$, and melting the glass at a temperature between about 1575° C. to about 1650° C. Preferably the temperature ranges from about 1590° C. to about 1630° C. Then, heat treating the glass according to a ceramming schedule to precipitate crystals, and achieve at least 30% by weight of forsterite component in the glass-ceramic at a liquidus temperature of about 1525° C. or below.

The present invention further includes an optical fiber and/or a gain medium comprising a transparent glass-ceramic containing a crystallinity of at least about 30% by weight of forsterite components at a liquidus temperature of about 1525° C.±5° C. or less.

Additional features and advantages of the invention will be described in the detailed description that follows.

BRIEF DESCRIPTION OF THE DRAWINGS

FIG. 1A is a phase diagram for the $K_2O$—MgO—$Al_2O_3$—$SiO_2$ system.

FIG. 1B is a phase diagram for the $Na_2O$—MgO—$Al_2O_3$—$SiO_2$ system.

FIG. 2 compares the fluorescence intensity of two kinds of forsterite-crystal-containing glass-ceramics—one with $Na_2O$ and another $Na_2O$-free—over a spectrum from about 900 nm to about 1400 nm.

FIG. 3A is a diagram showing absorption spectra at room temperature of a higher crystallinity $Na_2O$-containing glass-ceramic doped with $Cr^{4+}$ and its precursor glass, according to the present invention.

FIG. 3B is a diagram showing absorption spectra at room temperature of lower crystallinity $Na_2O$-free glass-ceramics doped with $Cr^{4+}$ and its precursor glass.

DETAILED DESCRIPTION OF THE INVENTION

The present invention is based in part on the discovery of a method to increase the overall crystallinity in a glass-ceramic, wherein at least 30% by weight of forsterite component is dissolved at a relatively low liquidus temperature of about 1525° C. or below. The method comprises providing a $R_2O$—MgO—$Al_2O_3$—$SiO_2$ glass composition, wherein R is an alkali ion, containing, in weight percent, at least about 3% of $Na_2O$ coupled with greater than 5% of $TiO_2$, and melting the glass at a temperature between about 1575° C. to about 1650° C., or preferably about 1580° C. to about 1635° C. Subsequently heat treating (ceramming) the glass to form a glass-ceramic. The $R_2O$—$Al_2O_3$—$SiO_2$ glass composition belongs to a family of compositions that can produce glasses of excellent stability and which can produce, when cerammed, substantially transparent glass-ceramics containing forsterite as the predominant crystal phase.

To produce a fine-grained glass-ceramic based on forsterite, it was necessary to produce a glass with amorphous phase separation, where one of the phases is highly enriched with MgO and the other is rich in glass formers, upon cooling or subsequent heating. This is because forsterite itself melts at 1890° C. (±20° C.) and does not form a glass even when rapidly cooled. Merely adding glass formers, like $SiO_2$, $Al_2O_3$, or $B_2O_3$, were not helpful since they only produced other phases like enstatite ($MgSiO_3$), cordierite ($Mg_2Al_4Si_5O_{18}$), or various other Mg-phases. The challenge, then, was to create a stable glass from which forsterite, and not the more siliceous Mg-rich crystals could form.

Previously, in the $K_2O$—MgO—$Al_2O_3$—$SiO_2$ system, glasses containing forsterite components were formulated. These glasses, however, never had more than about 25 wt % maximum crystal phase under reasonable manufacturing temperatures ($\leq \sim 1500°$ C.). The key clue to creating a more crystalline, transparent glass-ceramics, via phase separation from a glass composition that is rich in forsterite-components, derives from phase equilibria data in the $K_2O$—MgO—$Al_2O_3$—$SiO_2$ and analogous $Na_2O$—MgO—$Al_2O_3$—$SiO_2$ systems, which is shown, respectively, in the phase diagrams of FIGS. 1A and 1B. In the center of the forsterite liquidus field in the $Na_2O$—MgO—$Al_2O_3$—$SiO_2$ system of FIG. 1B, liquids saturated with about 45% forsterite by weight tend to crystallize from the melt at about 1500° C. In the analogous $K_2O$—MgO—$Al_2O_3$—$SiO_2$ system, at 1500° C., only about 25% forsterite component is soluble in the melt in the center of the forsterite liquidus field. This means that larger quantities of the forsterite component can be dissolved in $NaAlSi_2O_6$ glasses than in $KAlSi_2O_6$ glasses at the same liquidus temperature. Hence, a glass-ceramic containing more forsterite should be possible in the sodic system, as compared to the potassic system, without increasing the temperature. This feature saves costs and is advantageous for manufacturing conditions used in operations like fiber drawing. The compositions of the present invention detail a way to produce high forsterite crystallinity at relatively low liquidi.

The sodic family of glass compositions, in weight percent on an oxide basis, consists essentially of about 40% to 60% $SiO_2$; 10% to 25% $Al_2O_3$; 18% to 30% MgO; 3% to 10% $Na_2O$; 0% to 10% $K_2O$; >5% to 15% $TiO_2$. Preferably, the compositions consist essentially of about 43% to 55% $SiO_2$; 11% to 16% $Al_2O_3$; 20% to 26% MgO; 3.5% to 6.5% $Na_2O$; 3.0% to <8.0% $K_2O$; 5.5% to 9.0% $TiO_2$. Table 1 presents a few particular examples of glass compositions, which illustrate the parameters of this family, with the amount of each oxide expressed in terms of total weight percent. Of these examples, it was observed that the samples with mixed alkali experienced good nucleation (with between more than about 5.1 wt % to less than about 10 wt % of $TiO_2$), produced more forsterite, and formed stable glasses at liquidi of 1500° C. or below. A lower liquidus temperature allows fiber to be drawn at lower temperatures than usual, minimizes mixing (contamination) between materials of the fiber core and its cladding during drawing, and makes the highly Cr-doped glass less prone to uncontrolled devitrification. When $Na_2O$ and $K_2O$ are both present in mixed alkali samples, their content should be preferably in about a 1:1 molar ratio. Other glass forming oxides could also be included, such as possibly up to about 20 wt % of $GeO_2$, with a comparable molar percentage reduction of $SiO_2$. Trace to minor amounts of other alkali oxides, such as $Li_2O$, $Rb_2O$ and $Cs_2O$, as glass softeners are possible.

Fluorescence in the inventive forsterite glass-ceramic is induced by the addition of up to about 1.3 wt % $Cr_2O_3$, with preferred ranges from about 0.5–1.0 wt %, or more preferably within 0.55–0.7–0.8 wt % of chromium oxide ($Cr^{4+}$ or $Cr^{3+}$), to the parent glass. Other transition metal ions, including but not limited to $Ni^{2+}$, $V^{3+}$, $Co^{2+}$, $Cu^{2+}$, $Cu_{1+}$, $Mn^{2+}$, $Fe^{2+}$, and $Ti^{3+}$, also can be used as dopants in like amounts. The crystal structure of forsterite, as mentioned before, provides both tetrahedeal and octahedral cation sites of appropriate size to house transition metal cations. In particular, $Cr^{4+}$ ions are incorporated tetrahedrally, and $Cr^{3+}$, $Ni^{2+}$, $Co^{2+}$, $Cu^{2+}$, and $Mn^{2+}$ ions are incorporated octahedrally into the respective crystal sites. As known in the optics and laser arts, crystals with tetrahedrally coordinated $Cr^{4+}$ ions provide unique optical characteristics. Hence, the present inventive forsterite glass-ceramics are suitable for optical telecommunication uses in devices like optical fiber and gain media for amplifiers and pump lasers.

FIG. 2 shows the qualitative, relative fluorescence of a $Na_2O$-containing, $Cr^{4+}$-doped forsterite glass-ceramic (Line A) compared with a $Na_2O$-free glass-ceramic (Line B). Both glass-ceramics have an emission bandwidth from about 900 nm to about 1440 nm, and are both centered at a wavelength of about 1150 nm, when pumped with a 800 nm laser to excite $Cr^{4+}$ ions doped within. The $Na_2O$-containing composition has a higher fluorescence intensity, indicating the presence of a greater concentration of $Cr^{4+}$ ions, than the other glass. A more specific picture regarding $Cr^{4+}$ content is presented in FIGS. 3A and 3B. FIG. 3A shows the respective absorption spectra at room temperature of a piece of bulk higher crystallinity $Na_2O$-containing glass-ceramic doped with $Cr^{4+}$, according an embodiment of the present invention, compared to a "virgin" $Cr^{3+}$-containing glass before ceramming. FIG. 3B shows an analogous absorption spectra at room temperature of the same precursor $Cr^{3+}$-containing glass and a lower crystallinity, potassic, $Na_2O$-free glass-ceramic fiber doped with $Cr^{4+}$. Looking at FIGS. 3A and 3B together, clearly evident is the increase in absorption capacity in the $Na_2O$-containing glass-ceramic vis-à-vis the $Na_2O$-free glass. This means that the $Cr^{4+}$ content has greatly increased relative to the latter, potassic composition.

To produce a good glass-ceramic gain medium, with higher than average fluorescence intensity, like that shown in FIG. 2, the crystalline phase needs to be doped with high levels of chromium. This, however, presents a problem. Formerly, a glass composition that was highly doped with chrornium ions tended to devitrify uncontrollably. This phenomenon makes a high chromium-content glass impractical or difficult to use for most manufacturing applications such as fiber drawing. The present invention solves this problem by providing glass compositions with lower liquidi—making them less likely to devitrify—that are more readily capable of being fiberized at lower temperatures, in contrast to potassic compositions with higher liquidi. Without being held to any particular theory, we believe that this phenomenon is due in part directly to greater solubility of chromium in the sodic and mixed alkali system(s)—sodium-potassium. A second advantage of a relatively low liquidus temperature glass of the present invention is that for fiberization at lower working temperatures the core and cladding materials do not mix as readily. Hence, lessening the chance for core-cladding contamination or transmigration.

A higher crystalline yield of forsterite in the glass-ceramic is another result of the presence of a relatively high level of sodium, and should increase luminescent intensity and overall quantum efficiency, approaching those values for single-crystals. The higher sodium levels permit a relative increase in the level of MgO in the glass. Higher MgO levels, in addition to promoting forsterite formation, makes the glass chemically more alkaline or basic. The ratio of chromium 4+ ions to the total chromium content ($Cr^{4+}/Cr$) in the glass increases with increased MgO content and alkalinity. Higher chromium levels allow more $Cr^{4+}$ to be available for incorporation into the forsterite nanocrystals, thus further improving luminescence. Also, increased crystallinity decreases the space between crystals and promotes $Cr^{4+}$ ions left in the residual glass phase to migrate into the crystals during heat treatment.

Thus, a possible additional explanation for the increased luminescence and performance observed in FIG. 2, could be the increased alkalinity of the glass, which allows for greater magnesium solubility. Experimental data from both fluorescence and absorbance measurements indicate that the increase of $Cr^{4+}$ content is greater than would be normally expected from a mere increase in crystalline content. The present glass compositions, having an increase in crystallinity of up to about 50%, produced a $Cr^{+4}$ absorbance that appeared to be four times greater than that found in prior compositions. See, FIGS. 3A and 3B.

The level of alkalinity in these glasses can be estimated by the simple ratio: $(MgO+R_2O)/(Al_2O_3+SiO_2)$, where R is an alkali ion. It is believed that high valence states of chromium, in particular $Cr^{4+}$ and $Cr^{6+}$, increase with greater alkalinity. Thus, the present compositions permit a higher level of $Cr_2O_3$ to be dissolved in the glass. This not only does not cause the glass to undergo uncontrolled devitrification, but rather, contributes to flexible forming of high $Cr^{4+}$-doped optical fibers, since glass-ceramic materials are glass-based, they can be formed into any shape prior to nucleation and can be readily spliced to silica glass fibers. A transition metal doped glass-ceramic gain media is advantageous in that it can provide gain across every wavelength conceivable of interest in telecommunications today.

EXAMPLES

In a conventional furnace operating at temperatures of at least 1400° C., preferably about 1580–1620° C., the compositional examples of Table 1 were produced by melting well-mixed batch compounds in platinum crucibles for about 4 to 16 hours. Some melts were then poured as free "patties" and transferred to an annealer operating at about 550–600° C. Other melt samples, with high chromium levels of about 0.4 wt. % to over 1 wt. %, were either quenched with steel plungers or metallic rollers, or drawn as a cane (rod) or pulled as glass fibers directly from the crucible. Table 1 also presents the ceramming schedule in degrees Celsius and hours for each example, as well as the crystal phase(s) observed in each resultant glass-ceramic. The glass patties were subjected to a ceramming cycle, wherein the patties were first heated to a temperature within the range of about 600–800° C. for a period of time sufficient to generate nuclei, usually between about 4–12 hours. Second, the nucleated glass patties were then again heat-treated at a temperature within the range of about 750–950° C. for a period of time sufficient to grow crystals from the nuclei, typically between about 1–4 hours.

content produces opalescent to opaque glasses. The present compositions, although relatively high in $TiO_2$ content, are transparent to translucent. Titania in this situation helps produce a finer crystal size and improves transparency and/or translucency.

In the present inventive glass-ceramic, transparency or translucency is a function of the microstructure, which is a function of the composition and heat treatment. The microstructure of the inventive glass-ceramics contain forsterite nanocrystals of about 10 nm to about 50 or 60 nm in size, with a preferred size of under about 35 nm or about 30 nm. The present compositions enable one to create a glass-ceramic with a ≧30% yield of forsterite crystals by weight while at a relatively low liquidus temperature, within the range of about 1475° C. to about 1550° C., preferred range of about 1493±5° C. to about 1520±5° C. Preferably, the amount of crystallinity is about 35% or 40% to about 55% by weight.

Potential applications and devices that make use of the present inventive compositions include femtosecond and tunable lasers, wide bandwidth optical fiber amplifiers, and regenerative amplifiers in the near infrared wavelengths. Other possible applications and devices are described in detail in co-pending U.S. patent application Ser. No. 09/686,564, incorporated herein by reference.

TABLE 1

Forsterite Glass-Ceramic Compositions

EXAMPLE NO. (wt %)

| OXIDES | Ex. 1 | Ex. 2 | Ex. 3 | Ex. 4 | Ex. 5 | Ex. 6 | Ex. 7 | Ex. 8 |
|---|---|---|---|---|---|---|---|---|
| $SiO_2$ | 47.6 | 47.4 | 48.8 | 47.9 | 51.1 | 44.1 | 47.9 | 46.2 |
| $Al_2O_3$ | 13.3 | 13.3 | 11.3 | 13.5 | 13.1 | 17.5 | 13.4 | 12.0 |
| MgO | 21.6 | 21.4 | 22.1 | 21.8 | 18.7 | 21.4 | 21.7 | 24.8 |
| $Na_2O$ | 8.2 | 5.4 | 7.0 | 4.1 | 7.9 | 10.6 | 4.1 | 7.3 |
| $K_2O$ | — | 4.1 | — | 6.2 | — | — | 6.2 | — |
| $TiO_2$ | 9.1 | 8.2 | 10.7 | 6.4 | 9.1 | 6.2 | 6.3 | 9.0 |
| $CrO_3$ | 0.2 | 0.2 | 0.2 | 0.2 | 0.2 | 0.2 | 0.4 | 0.6 |
| Glass Quality | Green, clear | Green, clear | Green, clear | Green, clear | Green, clear | Green, clear | Dark Green, clear | Very Dark Green |
| Heat Treatment Temp. (° C.) @ hrs. | 750 @ 8 850 @ 2 | 750 @ 8 850 @ 2 | 700 @ 8 850 @ 2 | 700 @ 8 850 @ 4 | 750 @ 8 850 @ 2 | 750 @ 8 900 @ 2 | 700 @ 8 850 @ 4 | 700 @ 8 850 @ 4 |
| Glass-Ceramic | Brown | Brown | Brown | Greenish | Olive | Brown | Greenish | Dark Brown |
| X-ray diffraction Crystal phase(s) | Forsterite, Minor rutile | Forsterite, Faint rutile | Forsterite, rutile | Forsterite | Forsterite, Minor enstatite | Forsterite, Cordierite, Cristobolite | Forsterite | Forsterite, Minor rutile |
| Liquidus (° C.) | 1450 | 1500 | — | 1500 | — | — | 1500 | — |

The compositional examples were then examined using x-ray diffraction to identify their crystalline phases. All of the examples produced a predominant phase of forsterite crystals. The inventive compositions are self-nucleating because of liquid-liquid phase separation. Phase separation in the sodic system, however, is more difficult to achieve, unless large amount of titantia ($TiO_2$ over about 10 wt %) is present. Typically, in the sodic system glasses tends to produce relatively large-sized crystals. $TiO_2$ functions as a nucleating agent to control crystal size. Due to the presence of high levels of $TiO_2$, some examples also included either faint traces or minor levels of rutile percipitate. Yet, controlled use of optimized amounts of $TiO_2$, within a preferred range of about 5.7% to about 8.7% or 9.0% by weight, can either minimize greatly or eliminate this issue—as long as the amount and size (~10 nm) of rutile crystals present are small enough not to affect transparency in the near infrared region. Mixed $Na_2O$ and $K_2O$ samples showed the best results, with good nucleation and phase separation while using less than about 8.6 wt % $TiO_2$. Normally, high $TiO_2$ Although the present invention has been described by way of examples, those skilled in the art will understand that the invention is not limited to the embodiments specifically disclosed, and that various modification and variations can be made without departing from the spirit and scope of the invention. Hence, unless changes otherwise depart from the scope of the invention as defined by the following claims, they should be construed as included herein.

We claim:

1. A method of dissolving at least 30% by weight of forsterite component in a glass-ceramic, the method comprising:

providing a $R_2O$—MgO—$Al_2O_3$—$SiO_2$ glass composition, wherein R is an alkali ion, containing, in weight percent, at least about 3% of $Na_2O$ coupled with greater than 5% of $TiO_2$;

melting said glass at a temperature between about 1575° C. to about 1650° C.

2. The method according to claim 1, wherein said glass has a composition, in weight percent on an oxide basis, consisting essentially of about: 40–60% $SiO_2$; 10–25% $Al_2O_3$; 18–30% MgO; 3–10% $Na_2O$; 0–10% $K_2O$; >5–15% $TiO_2$.

3. The method according to claim 1, further comprising achieving at least 30% by weight of forsterite component in said glass-ceramic at a liquidus temperature of said glass composition of about 1525° C. or below.

4. The method according to claim 2, wherein $Na_2O$ and $K_2O$ are both present in about a 1:1 molar ratio.

5. The method according to claim 2, wherein said $TiO_2$ content by weight in said composition is greater than about 6%, and less than about 9%.

6. The method according to claim 2, wherein said composition further includes, in weight percent on an oxide basis, up to about 1.3% chromium oxide.

7. The method according to claim 6, wherein said composition includes, in weight percent on an oxide basis, about 0.05% to about 0.7% chromium oxide.

8. The method according to claim 2, wherein said composition further includes, in weight percent on an oxide basis, up to about 20% $GeO_2$.

9. The method according to claim 2, wherein said composition includes a transition metal ion selected from the group consisting of $Ni^{2+}$, $V^{3+}$, $Co^{2+}$, $Cr^{4+}$, $Cu^{2+}$, $Cu^{3+}$, $Mn^{2+}$, $Fe^{2+}$, and $Ti^{3+}$.

10. The method according to claim 2, wherein said crystallinity of said glass-ceramic is about 35% or more by weight of forsterite components.

11. The method according to claim 2, wherein crystals in crystal phase of said glass-ceramic have a size no larger than about 60 nm.

12. The method according to claim 2 wherein crystals in crystal phase of said glass-ceramic have a size between about 10 nm to about 35 nm.

* * * * *